United States Patent [19]

Ruth et al.

[11] Patent Number: 4,512,323
[45] Date of Patent: Apr. 23, 1985

[54] CARBURETOR VAPORIZER

[75] Inventors: John V. Ruth; Garfield C. Potts, both of Fort Worth, Tex.

[73] Assignee: Ultra Mileager Company, Inc., Fort Worth, Tex.

[21] Appl. No.: 573,021

[22] Filed: Jan. 23, 1984

[51] Int. Cl.³ .................................... F02M 31/00
[52] U.S. Cl. ............................ 123/557; 123/525; 123/549; 123/558
[58] Field of Search ............ 123/557, 549, 558, 525, 123/527, 575, 578, 552

[56] References Cited

U.S. PATENT DOCUMENTS

| 781,936 | 2/1905 | Cook | 123/558 |
|---|---|---|---|
| 1,623,074 | 4/1927 | Tartrais | 123/557 |
| 2,315,882 | 4/1943 | Tramble | 123/525 |
| 2,884,917 | 5/1959 | Quinby | 123/133 |
| 3,380,442 | 4/1968 | Johnson | 123/127 |
| 3,618,579 | 11/1971 | Varras | 123/127 |
| 3,738,334 | 6/1973 | Farr | 123/557 |
| 4,112,889 | 9/1978 | Harpman | 123/557 |
| 4,204,485 | 5/1980 | Perepolkin | 123/34 A |
| 4,213,433 | 7/1980 | Day | 123/549 |
| 4,249,501 | 2/1981 | Ehresmann | 123/552 |
| 4,249,502 | 2/1981 | Hover | 123/557 |
| 4,259,937 | 4/1981 | Elliott | 123/557 |
| 4,326,490 | 4/1982 | Ehresmann | 123/557 |
| 4,359,996 | 11/1982 | Kirkland | 123/578 |
| 4,398,523 | 8/1983 | Henson | 123/557 |

Primary Examiner—Ronald H. Lazarus
Attorney, Agent, or Firm—James E. Bradley

[57] ABSTRACT

A system vaporizes fuel for an internal combustion engine. This system has an auxiliary fuel tank connected to the main fuel pump. An auxiliary fuel pump has its intake connected to the auxiliary fuel tank and discharges into an auxiliary fuel line. The auxiliary fuel line passes through a preheater which heats the fuel through heat exchange with exhaust from the engine. The preheated fuel passes to a vaporizer chamber. The vaporizer chamber is electrically heated to vaporize the fuel, which then passes to the carburetor for mixing with air. The system has a bypass line to deliver an increased amount of fuel to the vaporizer chamber if the engine is accelerated. Valves and thermostats enable operation of the engine using conventional liquid fuel until the heat exchanger and vaporizer chamber reach operating temperature.

16 Claims, 2 Drawing Figures

CARBURETOR VAPORIZER

BACKGROUND OF THE INVENTION

1. Field of the Invention

This invention relates in general to devices for preheating gasoline delivered to a carburetor of a motor vehicle, and in particular to a device for vaporizing the gasoline prior to reaching the carburetor.

2. Description of the Prior Art

There have been numerous proposals to increase fuel economy in motor vehicles by heating the gasoline before it is delivered to the carburetor. Some of these proposals utilize the heat of the exhaust to preheat the gasoline. Others use electrical heating elements, and some propose both. Most teach that the system increases vaporization of the fuel to provide more complete burning.

While some of the proposals may be workable, generally considerable problems must be overcome. For complete vaporization, the gasoline must be heated to high temperatures. The system needs to allow the vehicle to operate on liquid fuel before vaporization temperature is reached. Also, the time to reach the vaporization temperature should preferably not be too long. In order to have adequate acceleration, the system must have provisions to increase the flow of vapor when accelerating.

SUMMARY OF THE INVENTION

A system is provided with this invention for vaporizing the fuel of an internal combustion engine. The system includes an auxilary fuel tank that is connected to the main fuel pump for receiving fuel from the main fuel pump. An auxiliary electric fuel pump is connected to the auxiliary fuel tank and discharges into an auxiliary fuel line. The auxiliary fuel line passes through a preheater heat exchanger that heats the fuel using heat generated from the exhaust of the engine. The preheated fuel proceeds to a vaporizing chamber which has an electrical heat element for vaporizing the fuel. The vaporizing chamber is sealed from the atmosphere and transmits the vapor air free to the carburetor where it is mixed with air.

The system includes a valve which prevents flow through the main fuel line once the proper temperature of the vaporizing chamber is reached. The system also includes means for increasing the flow of fuel to the vaporizing chamber when the vacuum in the engine decreases, such as during acceleration. The vaporizer chamber includes a housing within which a metallic block is located that is heated by an electrical element. The block is spaced from the top of the chamber where liquid fuel is brought in and transmitted out as a vapor.

DESCRIPTION OF THE PREFERRED EMBODIMENT

Figure 1:
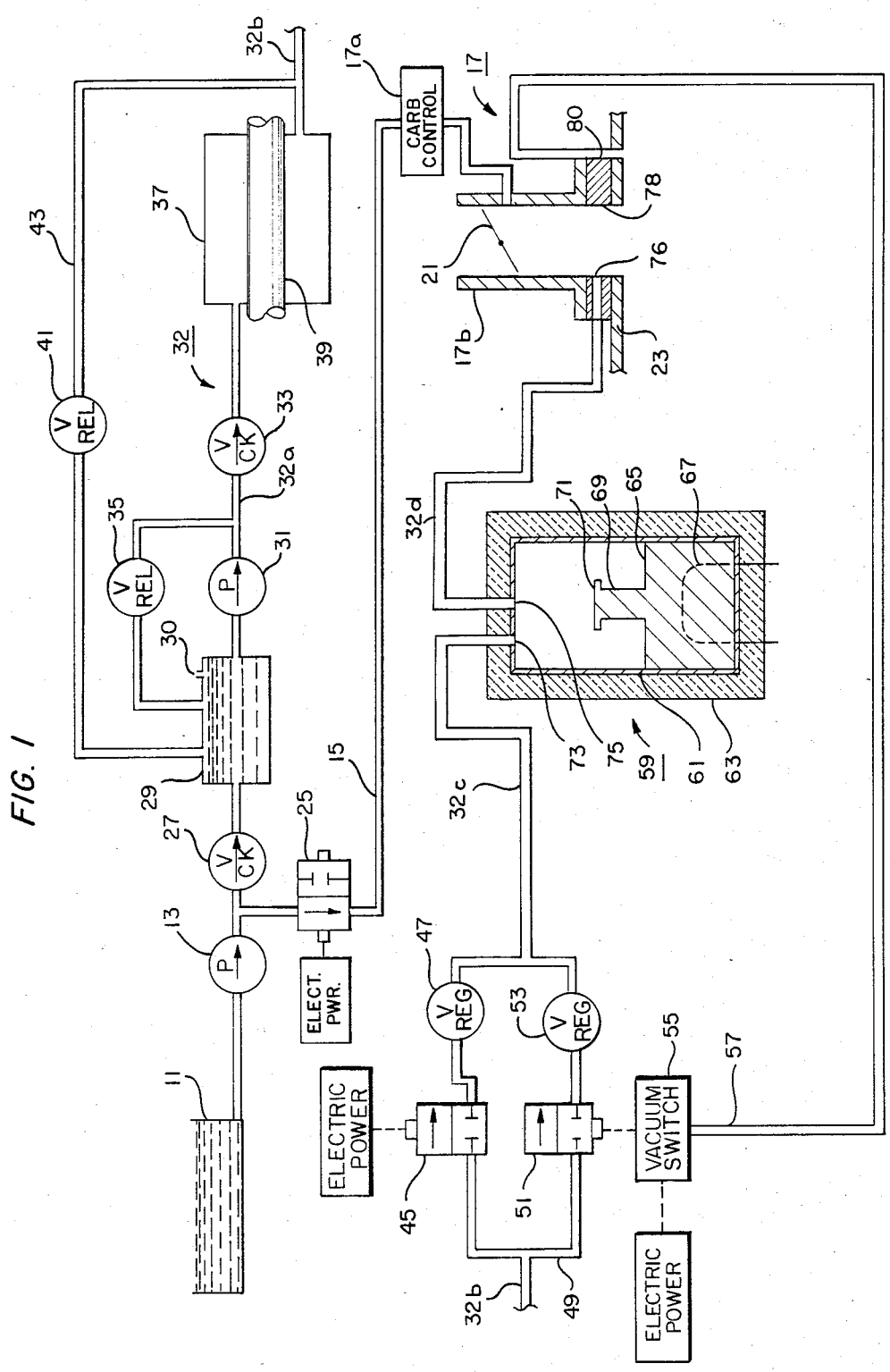
FIG. 1 is a schematic view of a system constructed in accordance with the invention, with the exception of the electrical components.

Referring to FIG. 1, the system shown will be used with a motor vehicle having an internal combustion engine (not shown) that uses principally gasoline for the fuel. The motor vehicle will have a main fuel tank 11 to which a main fuel pump 13 is connected. Fuel pump 13 is normally a mechanical fuel pump, but could be electrical with some vehicles. The main fuel pump 13 delivers fuel through a main fuel line 15 to the controls 17a of a carburetor 17. Controls 17a are conventional and include float valves, needle valves, and the like. Carburetor 17 has a throat 17b containing a butterfly valve 21 through which air is drawn. Butterfly valve 21 moves in response to a throttle peddle (not shown). The throat 17b is in communication with an intake manifold 23 of the motor vehicle engine.

A main line solenoid valve 25 is connected into the main fuel line 15. Solenoid valve 25 is an on/off valve which will allow fluid to flow through main fuel line 15 only when receiving electrical power. When electrical power is cut off, fuel will be blocked from main fuel line 15.

A check valve 27 is connected to the output side of main fuel pump 13 for preventing reverse flow of fuel toward pump 13. An auxiliary fuel tank 29 is connected to the other side of the check valve 27. Auxiliary fuel tank 29 is of much smaller capacity than the main fuel tank 11, it having only about one quart capacity as opposed to 16 to 20 gallons capacity normally contained within the main fuel tank 11. The auxiliary fuel tank 29 is continuously vented to the atmosphere through vent 30.

An auxiliary pump 31 has its intake connected to the auxiliary fuel tank 29 and its discharge connected to a first portion 32a of an auxiliary fuel line 32. Auxiliary fuel pump 31 is an electrically driven fuel pump capable of delivering fuel at pressures up to 70 psi (pounds per square inch) and normally operable around 50 psi. A check valve 33 is located in auxiliary line portion 32a to prevent reverse flow to auxiliary pump 31. A pressure relief valve 35 is connected in a line extending from the discharge end of auxiliary fuel pump 31 to the auxiliary fuel tank 29. Pressure relief valve 35 allows gasoline to feed back to the auxiliary tank 29 if the discharge pressure of the auxiliary pump exceeds 70 psi.

A preheater heat exchanger 37 is connected into the auxiliary line 32 on the downstream side of check valve 33. Heat exchanger 37 has a body that sealingly receives an exhaust conduit 39 through which hot exhaust from the engine is discharged. The body comprises an annular chamber surrounding conduit 39 for receiving fuel from the auxiliary fuel line portion 32a. Heat exchanger 37 serves as preheating means for heating the fuel in the body of the heat exchanger with heat from the exhaust of the engine.

A portion 32b of auxiliary fuel line 32 leads from an outlet of the heat exchanger 37. A pressure relief valve 41 is located in a line 43 that extends from auxiliary line portion 32b back to auxiliary fuel tank 29. Pressure relief valve 41 causes fuel to flow back to the auxiliary fuel tank 29 if the pressure in the fuel line portion 32b exceeds about 70 psi.

An auxiliary line solenoid valve 45 is connected into the auxiliary line portion 32b. Valve 45 allows fluid to pass only when receiving electrical power, and cuts off the flow otherwise. A regulating valve 47, preferably a needle valve, is located downstream of valve 45. The regulating valve 47 is a variable orifice that meters the flow of fuel through the auxiliary fuel line 32. The orifice dimensions of the regulator valve 47 are governed by a manual adjustment.

Auxiliary line 32 has a portion 32c that is connected to the regulating valve 47. A bypass line 49 extends from auxiliary line portion 32b to auxiliary line portion 32c, bypassing the auxiliary line valve 45 and the regulating valve 47. A low vacuum solenoid valve 51 is connected into the bypass line 49. Valve 51 is an on/off valve also, and is connected to a regulating valve 53, which can also be a needle valve that is adjustable. The orifice of valve 53 normally is much larger than the orifice of valve 47. Valve 51 is actuated by a vacuum switch 55, which in turn is connected to electrical power. Vacuum switch 55 is connected to a vacuum line 57 which leads to the intake manifold 23. When the intake manifold vacuum decreases to a low level, which occurs during acceleration, vacuum switch 55 will cause valve 51 to move to the open position, from the closed position shown.

The auxiliary line portion 32c leads to a vaporizing chamber 59. Vaporizing chamber 59 has a cylindrical housing that is completely sealed from the atmosphere and has a vertical axis. Insulation 63 surrounds housing 61. A heater block 65 is located in the interior of the housing 61. Heater block 65 has a cylindrical portion sized for close reception in a lower portion of the housing 61. Heater block 65 contains an electrical resistance wire 67 embedded therein for heating the block, which preferably is of aluminum. A reduced diameter neck 69 protrudes upwardly from the upper side of heater block 65. Neck 69 terminates in a flat flange or splash plate 71 that is of slightly greater diameter than the neck 69. Splash plate 71 is spaced below the top of the housing 61. The auxiliary fuel line portion 32c terminates in an inlet 73 that is located in the top of housing 61 for spraying fuel onto splash plate 71. Although not precisely shown in the schematic of FIG. 1, inlet 73 is preferably located directly above splash plate 71 to assure that the fuel strikes the splash plate 71.

An outlet 75 is also located in the top of housing 61 and connects to an auxiliary fuel line portion 32d. Fuel line portion 32d extends to a passage 76 in an adapter plate 80 that fits between the carburetor throat 17b and intake manifold 23. Adapter plate 80 has a central aperture 78 that registers with throat 17b. Passage 76 terminates at the aperture 78 for being drawn into the intake manifold 23.

Figure 2:
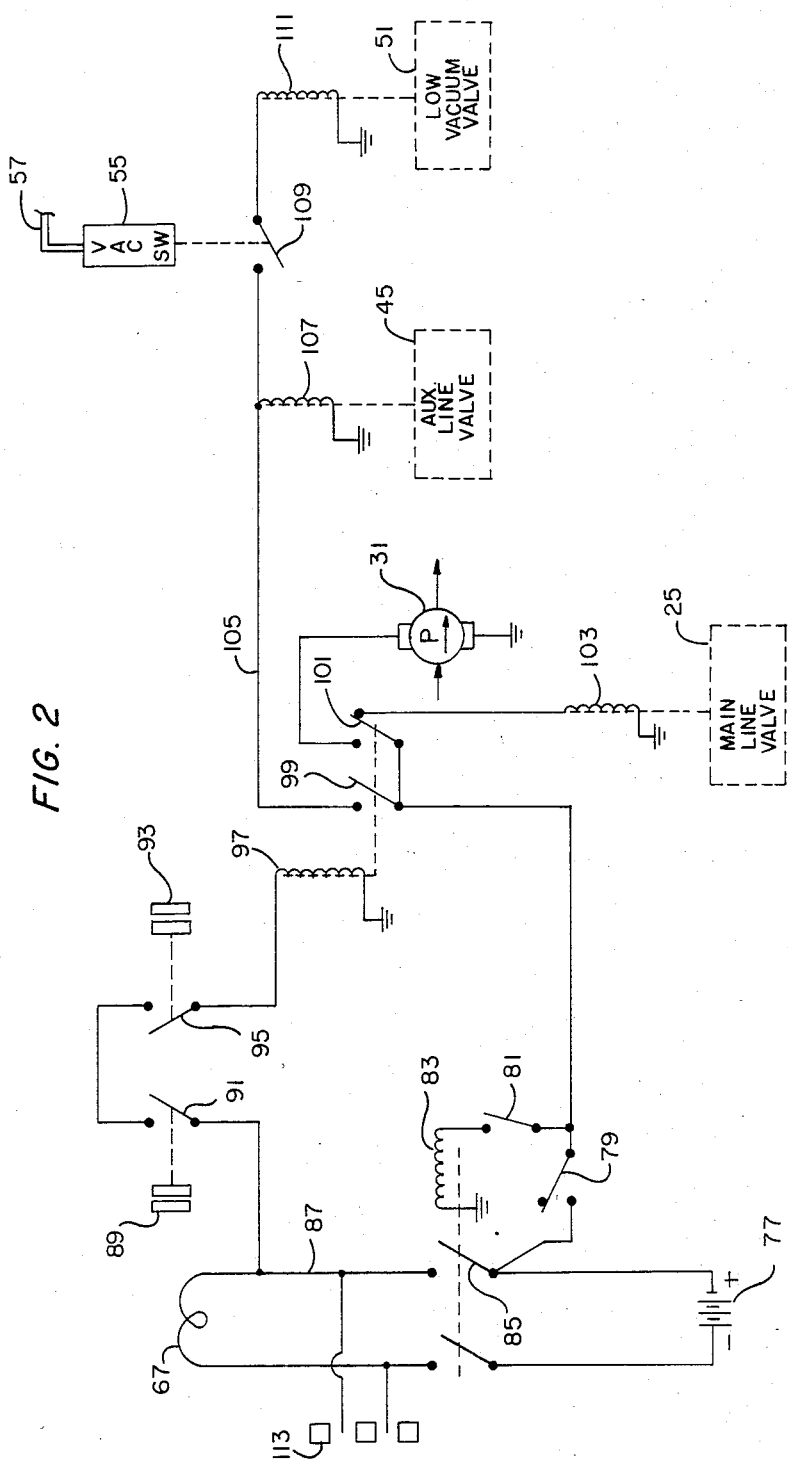
FIG. 2 is a schematic drawing of the electrical components for the system of FIG. 1.

Referring to FIG. 2, the motor vehicle will have a battery 77 for providing electrical power on the vehicle. Battery 77 is connected to an ignition switch pole 79. A select switch 81 is connected to the ignition pole switch 79. The opposite side of the select switch 81 is connected to a relay 83 which closes the poles of a two-pole switch 85. Switch 85, when closed provides power to lines 87. Select switch 81 is required to be closed to select the vaporization system, and the ignition switch pole 79 must be closed before select switch 81 has any effect.

Lines 87 provide power to the vaporization chamber heater element 67. The positive line of lines 87 leads to a vapor chamber thermostat 89 that is mounted to the heater block 65 (FIG. 1). Thermostat 89 is adapted to close switch 91 when a selected temperature has been reached, preferably 320° F. Another thermostat switch 93 is located in the heat exchanger 37 (FIG. 1). Thermostat 93 will close the pole of switch 95 when a selected minimum temperature is reached, preferably 300° F. Consequently, both thermostats 89 and 93 must be closed before positive current from the positive line of line 87 will flow through the switches 91 and 95.

A relay 97 is connected to switch 95 and is energized if thermostat switches 91 and 95 are closed. Relay 97, if energized, closes simultaneously switches 99 and 101. Switch 101 is connected directly to the ignition switch 79. Switch 101 provides power from battery 77 to a relay 103 when relay 97 is in the deenergized position as shown. Relay 103, when energized, closes main line valve 25, which is also shown in FIG. 1.

Switch 99 is also connected to ignition switch 79. When closed, it energizes a line 105. Line 105 leads to a relay 107. Relay 107, when energized, closes the auxiliary line valve 45, as shown also in FIG. 1. A switch 109 is connected into line 105. Switch 109 is energized by the vacuum switch 55, shown in FIG. 1. When switch 109 is closed, due to a low level of vacuum, it will energize a relay 111. Relay 111 controls the low vacuum valve 51, shown in FIG. 1, also.

A plug receptacle 113 has leads connected to lines 87. Plug 113 is adapted to be connected to a 12 volt DC source apart from the motor vehicle battery 77. When so connected, power from the DC source will flow through the heater element 67 to preheat the vaporizer chamber 59 (FIG. 1) prior to starting the engine.

In operation, the driver first closes the ignition pole 79 to start the vehicle. Power is immediately provided to relay 103 to actuate the main line valve 25. Once the engine starts, fuel will flow by means of pump 13 from main tank 11, through the main fuel line 15 and to the carburetor 17. The vehicle will operate in a normal manner. If switch 81 is open, the auxiliary pump 31 will not be energized and will not be energized and will not receive any fuel. The vaporization system will not be operating.

For operation of the vaporizing system, the switch 81 should be closed. If closed, upon closure of ignition switch 79, power is provided to relay 83, which closes poles 85. This provides power to the heater element wire 67 to begin heating the heater block 65. When the heater block 65 reaches 320°, the thermostat 89 will close switch 91. When the heat exchanger 37 temperature reaches 300° F. due to hot exhaust gas, thermostat 93 will close switch 95. When both switches 91 and 95 are closed, power is provided to relay 97, which closes switches 99 and 101. When switch 101 shifts position, it deenergizes relay 103, and shifts valve 25 to the closed position to prevent any flow through the main fuel line 15. At the same time, it energizes the auxiliary fuel pump 31 to begin pumping fuel through auxiliary line 32.

The closing of switch 99 energizes line 105, which provides power to relay 107 to actuate the auxiliary line valve 45. This moves valve 45 to the open position to allow fuel in the auxiliary line portion 32b to pass through the regulator 47 to the line portion 32c. The fuel will be warmed by the heat exchanger 37, then will pass into the vaporizer chamber 59 where the hot metallic block 65 causes the fuel to vaporize. The splashing of fuel onto splash plate 71 facilitates vaporization. The vapor flows through line 32d into the carburetor intake. It will mix with air flowing past butterfly valve 21 at that point, then proceed through the intake manifold 23 to the piston cylinders for combustion. Prior to reaching the carburetor 17, the fuel in the auxiliary fuel line 32 is completely free of any mixture with air.

If the vacuum drops below a selected level, such as when occurs when accelerating, the low level of vacuum will actuate the vacuum switch 55 to open the low vacuum valve 51. This allows liquid fuel to flow not only through the regulator 47 but to flow through the regulator 53. Bypass line 49 and valves 51 and 53 serve as metering means for increasing flow of fuel to the vaporizer chamber 59 to increase the speed of the vehicle. The main fuel pump 13 will not deliver fuel directly to the carburetor 17 through the main fuel line 15 unless the select switch 81 is open to cut off the vaporization system.

The system is designed for installation on existing motor vehicles. To install the system, the conventional carburetor 17 is removed and the adapter plate 78 placed between the carburetor 17 and the intake manifold 23. The auxiliary tank 29, electrical fuel pump 31 and various valves and associated components are connected into the existing system as shown.

The invention has significant advantages. The system allows an operator to drive under conventional liquid fuel, and to selectively switch to a vapor system. The vapor system provides a high degree of vaporization because of the preheater and the high temperature of the vaporization chamber. Delaying mixing of any air with the fuel until the carburetor reduces the chances for an explosion. The bypass line allows increased fuel flow if the vacuum level drops under acceleration to provide adequate power for normal driving conditions. The thermostats allow the system to automatically convert from liquid fuel to vapor without requiring the driver to take any additional action. The large metallic block and protruding splash plate of the vaporizing chamber provides highly efficient vaporization. If desired, the vaporizer can be heated prior to starting the engine, using the external receptacle.

While the invention has been shown in only one of its forms, it should be apparent to those skilled in the art that it is not so limited but is susceptible to various changes without departing from the scope of the invention.

We claim:

1. A system for vaporizing fuel for an internal combustion engine having a main fuel pump for pumping fuel from a main fuel tank through a main fuel line to a carburetor, comprising in combination:
   an auxiliary fuel tank connected to the main fuel pump for receiving fuel pumped by the main fuel pump;
   an auxiliary fuel pump having an intake connected to the auxiliary fuel tank and a discharge connected to an auxiliary fuel line;
   preheater means for heating the fuel in the auxiliary fuel line with exhaust from the engine;
   a vaporizer chamber sealed from the atmosphere and connected to the auxiliary fuel line downstream of the preheater means, the vaporizer chamber having an electrically heated element upon which fuel from the auxiliary line is discharged to create air-free vapor, the vaporizer chamber having an outlet connected to the carburetor for transmitting the air-free vapor to the carburetor for mixing with air and for combustion; and
   valve means connected into the main fuel line for preventing flow through the main fuel line when vapor is being delivered by the vaporizer chamber.

2. The system according to claim 1 further comprising:
   a pair of orifices mounted in parallel conduits in the auxiliary fuel line upstream from the vaporizer chamber; and
   vacuum valve means mounted in one of the parallel conduits for preventing flow through one of the orifices unless engine vacuum reaches a selected level.

3. The system according to claim 1 further comprising:
   valve means for preventing flow through the auxiliary fuel line to the vaporizer chamber until a minimum temperature of the heater element is reached.

4. The system according to claim 1 further comprising:
   pressure relief means connected between the discharge of the auxiliary fuel pump and the auxiliary fuel tank for returning fuel to the auxiliary fuel tank if the pressure of the auxiliary fuel pump exceeds a selected maximum.

5. The system according to claim 1 further comprising pressure relief means connected between the outlet of the preheater means and the auxiliary fuel tank for returning fuel to the auxiliary fuel tank if the pressure in the auxiliary fuel line at the outlet of the preheater means exceeds a selected maximum.

6. A system for vaporizing fuel for an internal combustion engine having a main fuel pump for pumping fuel from a fuel tank through a main fuel line to a carburetor, comprising in combination:
   an electrical auxiliary fuel pump in communication with the fuel tank and having a discharge connected to an auxiliary fuel line;
   a preheater heat exchanger coupled to a portion of an exhaust conduit and to the auxiliary fuel line for heating the fuel in the auxiliary fuel line with heat from the engine exhaust;
   a variable flow orifice connected into the auxiliary fuel line for metering fuel flow pumped by the auxiliary fuel pump;
   a bypass conduit extending around the orifice;
   vacuum valve means in the bypass conduit for allowing flow through the bypass conduit if engine vacuum drops to a selected minimum level;
   a vaporizer chamber sealed from the atmosphere and connected to the auxiliary fuel line downstream of the heat exchanger, the vaporizer chamber having an electrically heated element upon which fuel from the auxiliary line is discharged to create vapor, the vaporizer chamber having an outlet connected to the carburetor for transmitting the vapor to the carburetor for mixing with air and for combustion; and
   valve means for preventing flow to the vaporizer chamber until the vaporizer chamber interior and the heat exchanger reach selected minimum temperatures, and for cutting off flow through the main fuel line when both of the minimum temperatures are reached.

7. The system according to claim 6 wherein the heater element of the vaporizer chamber comprises:
   a metallic block containing an electrical heater wire embedded therein, the block being spaced below the top of the vaporizer chamber, the inlets and outlets of the vaporizer chamber being located above the top of the block.

8. The system according to claim 7 wherein the block has an upwardly protruding reduced diameter neck, and a splash plate of diameter larger than the neck located above the neck.

9. A system for vaporizing fuel for an internal combustion engine having a main fuel pump for pumping fuel from a main fuel tank through a main fuel line to a carburetor, comprising in combination:

an auxiliary fuel tank connected to the main fuel pump for receiving fuel pumped by the main fuel pump;

an auxiliary fuel pump having an intake connected to the auxiliary fuel tank and a discharge connected to an auxiliary fuel line;

a vaporizer chamber having a housing sealed from the atmosphere and containing a metallic block having an electrical heater wire embedded therein, the block being spaced below the top of the housing, the vaporizer chamber having an inlet located above the block which is connected to the auxiliary fuel line for discharging fuel onto the block to cause vaporization, the vaporizer chamber having an outlet leading to the carburetor for mixing vaporized fuel with air in the carburetor; and metering means for increasing flow of fuel through the auxiliary fuel line to the vaporizer chamber when the vacuum level in the carburetor drops; and valve means for preventing flow to the vaporizer chamber until the vaporizer chamber reaches a selected minimum temperature, and for cutting off flow through the main fuel line when the minimum temperature is reached.

10. The system according to claim 9, further comprising receptacle means connected to the electrical heater wire for receiving an external source of power to heat the metallic block prior to operation of the engine.

* * * * *